United States Patent Office 3,271,130
Patented Sept. 6, 1966

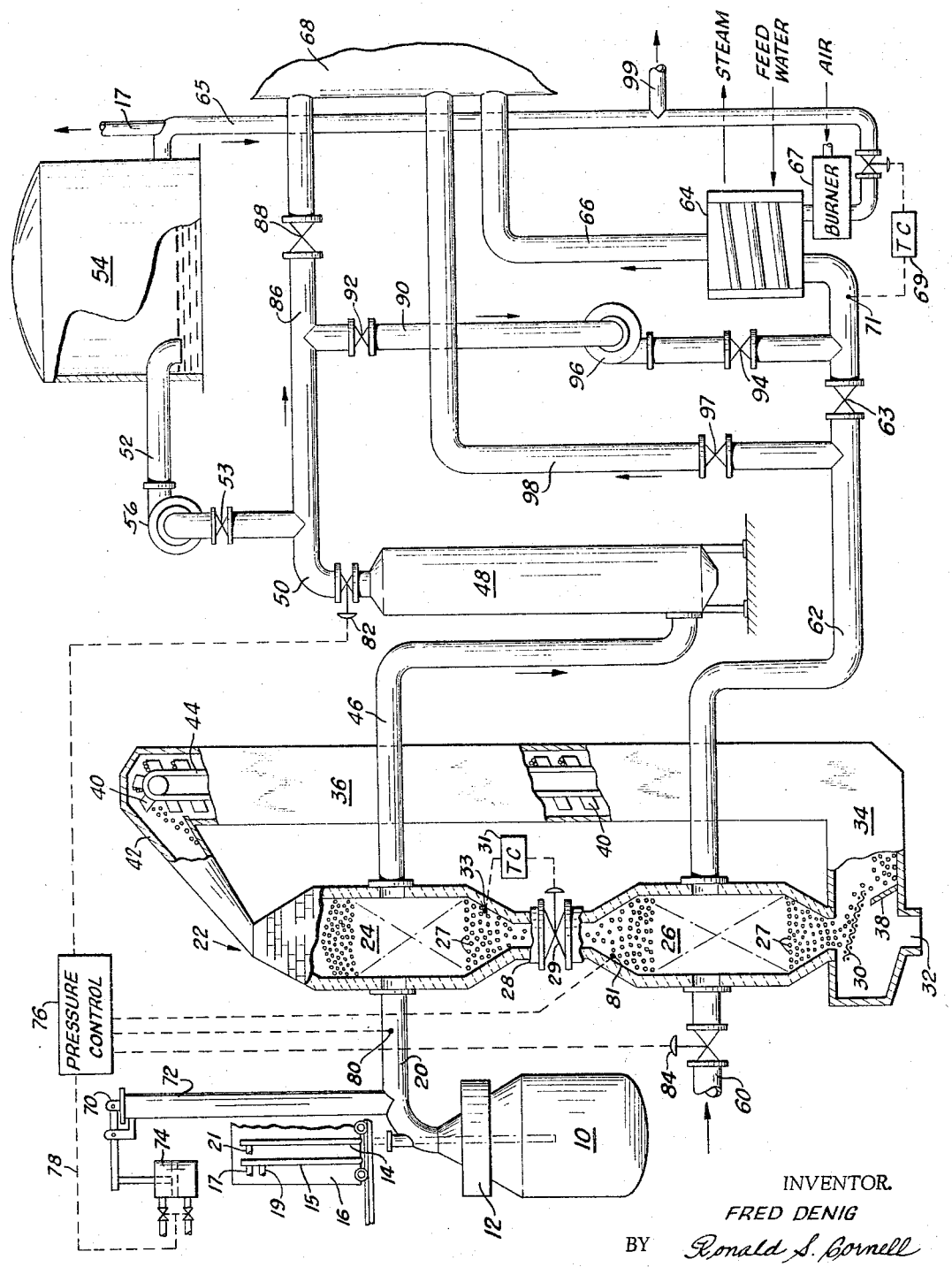

3,271,130
METHOD AND APPARATUS FOR TREATING GASES
Fred Denig, Kilchberg, Zurich, Switzerland, assignor to Koppers Company, Inc., a corporation of Delaware
Filed Nov. 5, 1963, Ser. No. 321,561
8 Claims. (Cl. 75—60)

This invention relates to a method and apparatus for treating gases from a metallurgical furnace and, more particularly, for the treatment and use of gases from a basic oxygen furnace.

In the operation of a metallurgical furnace such as a basic oxygen furnace, scrap is charged into a basic oxygen converter, the scrap is preheated, hot metal is added, oxygen is turned on, and limestone is charged. After the oxygen blow period the converter is tilted to decant most of the slag and then the steel is poured into a ladle. Large volumes of carbon monoxide are generated during the oxygen blow period by the reaction of oxygen with the carbon in the iron to be refined. The gases which are discharged from the mouth of the basic oxygen converter may contain as much as 70 percent carbon monoxide. The carbon monoxide in these gases will be burned to carbon dioxide if the gases come in contact with oxygen. Consequent to such combustion, great quantities of heat are released. In addition the gases discharged from a metallurgical furnace such as a basic oxygen furnace are laden with a great deal of impurities such as dirt and metal oxides. Thus, large quantities of impurity containing hot gases are released to the surrounding atmosphere. Such gases are detrimental to the health and well being of any community in the neighborhood of the metallurgical process.

Heretofore, attempts have been made to control the release of hot impurities into the atmosphere by the provision of hoods placed over the basic oxygen converter in conjunction with apparatus to cool and clean the gases emitted from the basic oxygen converter. These previous efforts have involved the removal of the gases from the basic oxygen converter while maintaining these gases out of contact with the atmosphere, cooling these gases, cleaning them and then venting the clean gas to the atmosphere.

It has now been discovered that these gases may be cooled, cleaned and stored for future use as a heating gas having a heating value of about 220 B.t.u. Simultaneously, by use of the apparatus of this invention, it is possible to recover and utilize the heat removed from these gases.

Heretofore, attempts have been made to use the hot gases from a basic oxygen furnace to produce steam. A problem arose, however, in that these gases are only produced for a period of about twenty minutes out of each hour. For this reason the production of steam has been intermittent. Since the steam is needed on a continuous basis the methods used heretofore have been unsatisfactory.

It is an object of this invention to provide an apparatus for the treatment of hot, dirty gases issuing from a metallurgical furnace such as a basic oxygen furnace whereby these gases can be efficiently cooled, cleaned and stored, and a method for recovering both the heating value of the gases and the heat which is present in the system. Another object of the invention is to continuously provide steam for use in the plant, and a still further object is to use the gas from the basic oxygen furnace to preheat the scrap in a succeeding heat whereby the cost of operation can be significantly reduced.

According to the invention, the hot dirty gases issuing from a basic oxygen converter or other metallurgical furnace are passed to a pebble heat exchanger wherein these gases are cooled. The gases are then cleaned and stored. The pebbles in the pebble heat exchanger are continuously circulated through a heat recovery cycle wherein a stream of air or other gaseous material is passed over heated pebbles thereby picking up the heat from the pebbles. This heat is then recovered in a suitable heat recovery device such as a waste heat boiler.

The above and further objects and novel features of the invention will appear more fully from the detailed description when the same is read in conjunction with the accompanying drawing. It is to be expressly understood, however, that the drawing is not intended to be a definition of the invention but is for the purpose of illustration only.

The drawing sets forth in schematic form a partially cross-sectional view of the apparatus of the invention.

Referring now to the drawing, this invention is advantageously used with a closed bottom converter in an oxygen steelmaking process but may also be used with other types of furnaces. Basic oxygen converter 10 as schematically illustrated is a conventional closed bottom converter. Removably mounted above converter 10 is a hood 12 for removing fumes and smoke from the converter. Charging means (not shown) are provided for the converter 10 and an oxygen lance 14 is provided for introducing a jet of substantially pure oxygen from a suitable source of supply against the material charged into the converter.

Intense heat is generated in the converter during the oxygen lancing process as well as a large quantity of gases. The oxygen lance 14 can be supported by suitable means such as holding means 16 and the lance can be raised or lowered by suitable means (not shown). This type of system is more fully described in an application by Richard F. Obenchain and Floyd F. Standley, Serial No. 852,795, filed November 13, 1959, now Patent No. 3,119,889.

The large quantities of gases which come billowing out of the oxygen converter 10 are passed through hood 12 and conduit means 20 to a pebble heat exchange device designated generally as numeral 22. These gases which are at a temperature of about 3000 to 4000° F. pass into cooling section 24 of pebble heat exchanger 22.

The pebble heat exchanger 22 includes two chambers 24, 26 which chambers each hold a large quantity of heat exchange pebbles 27. The heat exchange pebbles 27 may be, for example, mullite, kaolin, small pieces of refractory material, steel balls, or some other material which has the ability to store heat. Hot gases from the metallurgical furnace 10 are passed through conduit means 20 into cooling chamber 24 wherein the gases are cooled by direct contact with the heat exchange pebbles 27 therein whereby the temperature of the pebbles 27 is raised. Thus, gases removed from chamber 24 are considerably cooler than the gases which enter this chamber. Pebbles which have been heated in chamber 24 are passed through throat means 28 and pass into chamber 26 wherein these pebbles are cooled by passing a cold gas therethrough. Cooled pellets from chamber 26 pass over screen 30 for removal of any entrained dust. The removed dust falls through screen 30 and outlet means 32. The pebbles from screen 30 fall into connecting means 34 which forms a passageway between chamber 26 and an elevator 36. The pebbles in connecting means 34 are kept from falling into outlet means 32 by baffle means 38, and the pebbles pass to the bottom of elevator means 36 at which point they are picked up by scoops 40, carried upwardly and dropped through connecting means 42 through which they return to chamber 24 to repeat the heat exchange cycle. The scoops 40 are mounted on an endless conveyor 44 which is located within a dust tight housing.

The pebble heater 22 is preferably provided with a valve means 29 in throat 28. Valve 29 functions to maintain the combustible gas in chamber 24 out of contact with the gases in chamber 26. This is necessary when an oxygen containing gas is passed through chamber 26. If no seal is maintained an explosion hazard is created. When nitrogen or other inert gas is used in chamber 26 such seal may not be necessary. Valve 29 is preferably controlled by temperature controller 31 which operates valve 29 in response to temperature sensing means 33 in chamber 24 to open valve 29 when the temperature of pebbles 27 in chamber 24 is sufficiently high.

It may be desirable to raise the pebbles 27 by means other than the use of a bucket elevator to recycle them from chamber 26 to chamber 24. An alternate method for raising these pebbles can be used; for example, instead of endless bucket conveyor 44 a jet of compressed air or compressed nitrogen can be used for lifting the pebbles through a suitable conduit to recycle them.

As discussed above, the gases issuing from converter 10 pass through hood 12 and conduit 20 and into the cooling section 24 of the pebble heat exchanger 22 wherein the hot raw gases are cooled. These cooled gases are then passed through conduit 46 into a cleaning device 48 which can comprise, for example, a washing tower or scrubber wherein the fine particles of dust and metal oxides are removed and wherein the temperature of the gases may be further lowered. A suitable gas cleaner of this type is shown in Russell A. Powell, United States Patent No. 3,041,059 issued June 26, 1962. While I have described a particular type of gas cleaner 48, other suitable cleaning devices can be used; for example, a dry gas cleaner such as an electrical precipitator can also be used.

The clean gases are removed from gas cleaner 48 through conduit 50 and are preferably passed through conduit 52 to a gas holder 54 for storage therein. The gases which are stored will have a heating value of about 220 B.t.u. The gas holder 54 is provided with a water seal 58 in order to prevent any backflow of gas during the off-make period. The clean gas flowing through line 52 must be pressurized and forced into the gas holding tanks 54. For this purpose, there is provided a blower 56.

In a preferred embodiment of this invention, there is provided both an oxygen lance 14 and a fuel-oxygen lance 15. The oxygen lance is provided with oxygen through conduit 21 and is used during the blowing period of the heat. The fuel-oxygen lance is primarily used for preheating the scrap after it has been charged to the basic oxygen furnace. As an important feature of this invention, it is contemplated that the gas recovered from the basic oxygen furnace is used as the fuel for the fuel-oxygen lance. For this purpose there is provided a conduit 17 operatively connecting gas holder 54 with fuel-oxygen lance 15 to supply fuel thereto. Oxygen is supplied to fuel-oxygen lance 15 through conduit 19. Both the oxygen lance 14 and the fuel-oxygen lance 15 are suitably supported on carriage 21. The use of both an oxygen lance and a fuel-oxygen lance is described more fully in copending application Serial No. 152,832 filed November 16, 1961, now Patent No. 3,170,977, by Richard F. Obenchain and having the same assignee as this application.

While the clean gases flowing through line 50 from gas cleaner 48 have been described as being directed through conduit 52 to gas holder 54, it may be desirable to pass these gases directly to a stack 68. For this purpose there is provided a conduit 86 having valve 88 therein. In the alternative, if the gases still contain recoverable heat it may be desirable to pass the clean gases to a heat recovery means 64 described more fully below. For this purpose there is provided a branch conduit 90 having valves 92, 94 and a booster fan 96 therein. Thus, by closing valve 53 in conduit 52 and valve 88 in conduit 86 while simultaneously opening valves 92 and 94 in conduit 90 and actuating fan 96, it becomes possible to pass the gases from gas cleaner 48 to the heat recovery means 64. If the gases from oxygen converter 10 have been cooled to a low temperature and these gases do not contain a high B.t.u. value, it will then be desirable to vent these gases to stack 68 by opening valve 88 and closing valves 53, 92 and 94.

In the manner described above the hot pebbles from chamber 24 of pebble heat exchanger 22 are passed through throat 28 into chamber 26. In order to cool the hot pebbles a cool gas such as nitrogen, air, etc. is passed through conduit 60 into chamber 26. This cool gas comes in direct contact with the hot pebbles therein and thereby recovers the heat from the system. As a result of the heat exchange the gas becomes heated to a high temperature. This heated gas passes out of chamber 26 through conduit 62 which passes the heated gas to a suitable heat recovery means such as a waste heat boiler 64. The hot gases pass through the waste heat boiler and transfer a large amount of heat thereto which heat would otherwise be lost. When the heat recovery means is a waste heat boiler the hot gases produce large quantities of steam which can be used elsewhere in the plant. In this manner, the waste heat from the basic oxygen converter can be recovered. The gases after giving up their heat in waste heat boiler 64 are passed through conduit 66 to a stack 68 which vents the gases to the atmosphere.

The period during which oxygen is blown into the oxygen converter 10 thus producing large quantities of hot gases lasts for only about twenty minutes during each hour; the remainder of the time is used for charging, discharging, etc. Thus, the production of steam in waste heat boiler 64 tends to be discontinuous. However, the need for steam throughout the plant is continuous. Accordingly, this invention provides conduit means 65 for passing gas from gas holder 54 to waste heat boiler 64 to supplement the heat provided by the gases passing through pebble heat exchanger chamber 26. The gas from gas holder 54 is mixed with air in burner 67 to provide supplemental heat for waste heat boiler 64 whereby continuous production of steam can be obtained. It is desirable to control the admission of this supplemental heating gas by means of a temperature controller 69 in response to variations in temperature as determined by temperature sensing means 71 in conduit 62.

If the gas in conduit 62 is not used for the production of steam in waste heat boiler 64, valve 97 in bypass conduit 98 can be opened while simultaneously closing valve 63 in conduit 62. In this manner, the gases from section 26 of pebble heat exchanger 22 can be vented to the atmosphere through stack 68.

The apparatus of this invention is further provided with a safety valve 70 connected through conduit 72 to gas offtake 20 to provide a safety release in the event of a sudden surge of gases from the basic oxygen converter. The safety valve is actuated by suitable means such as an hydraulic actuator 74 which is automatically controlled in a manner known in the art by pressure controller 76 through actuating line 78 upon an indication of a surge of pressure in line 20 which indication is obtained from pressure indicator 80.

The pressure controller 76 also operates to control the relative pressures in chambers 24 and 26 of pebble heat exchanger 22 by actuation of valves 82, 84. These valves are controlled to maintain the two chambers 24, 26 at approximately equal pressure whereby there is no gas flow from one chamber to the other. Determination of the gas pressures in chambers 24 and 26 can be obtained by pressure controller 76 from pressure indicators 80, 81. In some instances, it may be desirable to cause a small gas flow from chamber 26 to chamber 24 in order to ensure that no dirty gases contaminate the clean gas flowing through chamber 26. This can be achieved by automatic adjustment of damper valve 82 in response to signals from pressure controller 76.

In frequent instances, it will be suitable to employ a plurality of basic oxygen converters in the combination of my invention, and the schematic reference hereinabove made to converter 10 in the drawings is intended to indicate not only one but more than one converter. Most practicably, two or three and at most four converters 10 can be employed in combination with a single system for cleaning, and recovering heat from, the gases effluent thereof. Advantageously, the use of two converters, one of which can be used in preheating or melting scrap while the other is on oxygen-blow will ensure the delivery to the pebble heater 22 and specifically to the cooling or heat recovery section 24 of hot gases more uniformly throughout an extended operating period. Further the heat exchange pebbles 27 that have been heated in chamber 24 will pass therefrom at a more uniform rate, as governed by valve 29 and temperature controller 31, to provide ultimately a supply of hot gases of more uniform temperature.

It has been provided herein that temperature sensing means 71 will govern the flow of gas from holder 54 to the waste heat boiler 64, and that this gas will also be withdrawn from the holder 54 through conduit 17 to preheat the scrap in converter 10. In any case, and especially when the said plurality of converters 10 are employed, the gas, of high B.t.u. content, can be continuously or intermittently directed through conduit 99 to other heat recovery means in adjacent facilities of the steel plant or can, for example, be used to melt scrap iron before it is charged to the converter.

I claim:

1. Apparatus for the treatment of dirty waste gases from a metallurgical furnace comprising, a pebble heat exchanger having two chambers, a first chamber for cooling said waste gases, a second chamber for heating a gaseous material while simultaneously cooling said pebbles, means to pass pebbles from said first chamber to said second chamber, and means to recycle pebbles from said second chamber to said first chamber; conduit means to pass gases from said metallurgical furnace to said first chamber; a gas cleaner to clean said waste gases; means to pass gas from said first chamber of said pebble heat exchanger to said gas cleaner; a gas holder for storage of gas; means for passing cleaned gas from said gas cleaner to said gas holder; means to pass cold gas into second chamber of said pebble heat exchanger for cooling said pebbles and heating said cold gas; heat recovery means to recover heat from said heated cold gas; means for pasing gas from said second chamber to said heat recovery means; stack means for venting gas to the atmosphere; and means for passing gas from said heat recovery means to said stack means.

2. Apparatus for the treatment of dirty waste gases from a basic oxygen converter comprising in combination; a pebble heat exchanger including a plurality of pebbles, a first chamber for cooling said waste gases and simultaneously heating the pebbles, a second chamber for heating a gaseous material while simultaneously cooling said pebbles, means to pass said pebbles from said first chamber to said second chamber, and means to recycle pebbles from said second chamber to said first chamber; conduit means to pass gases from said basic oxygen converter to said first chamber; a gas cleaner to clean said waste gases; means to pass gases from said first chamber to said gas cleaner; a gas holder for storage of gas; means for passing cleaned gas from said gas cleaner to said gas holder; means to pass a cold gas into said second chamber of said pebble heat exchanger for cooling said pebbles while heating said cold gas; a waste heat boiler; means for passing said heated cold gas from said second chamber to said waste heat boiler; stack means to vent gas to the atmosphere; and means for passing gas from said waste heat boiler to said stack means.

3. Apparatus for continuously cooling, cleaning and storing waste gases comprising in combination, a basic oxygen converter; means for injecting oxygen under pressure into said basic oxygen converter whereby there is formed large quantities of hot, dirty gas; a pebble heat exchanger including means for continuously circulating pebbles through said heat exchanger; means connecting said basic oxygen converter with a first section of said pebble heat exchanger whereby the hot dirty gas formed in said basic oxygen converter is passed to said first section of said pebble heat exchanger wherein said hot dirty gas transfers a portion of its heat to said pebbles to form cool dirty gas; gas cleaner means for cleaning said cool dirty gas to form cool clean gas; conduit means connecting said first section with said gas cleaning means; gas holding means for storing said cool clean gas; conduit means connecting said gas cleaner with said gas holding means; means for passing a gaseous coolant through a second section of said pebble heat exchanger whereby the pebbles in said second section give up a portion of their heat to the coolant, waste heat boiler means for recovering the heat transferred to said coolant; means connecting said second section with said waste heat boiler, stack means for venting gas to the atmosphere; and means connecting said waste heat boiler with said stack means.

4. A method for continuously cooling, cleaning, and storing impure gases from a basic oxygen converter comprising: injecting oxygen under pressure into a basic oxygen converter whereby there is formed large quantities of hot, dirty gas; contacting said hot, dirty gas with an inert heat exchange material whereby said hot, dirty gas transfers a portion of its heat to said inert material to form cool, dirty gas and hot inert material; cleaning said cool, dirty gas to form cool, clean gas, and storing said cool, clean gas; passing a gaseous coolant into direct heat exchange with said hot inert material whereby said inert material transfers a portion of its heat to the coolant to form heated coolant; bringing said heated coolant into heat exchange contact with water to form steam; and using said stored, cool, clean gas to form additional quantities of steam when the temperature of said coolant is insufficient to form sufficient quantities of steam.

5. A method for the treatment of impure gases from a basic oxygen converter comprising: removing said impure gases from said basic oxygen converter, cooling said impure gases by direct contact thereof with an inert heat exchange material to produce cooled impure gases and heated inert heat exchange material, and cleaning said cooled gases to form clean, cooled gas; passing a second gaseous material into direct contact with said heated inert heat exchange material whereby heat is transferred to said second gaseous material to produce heated second gaseous material and cooled inert heat exchange material, passing said heated second gaseous material into heat exchange contact with water to produce steam; recovering and storing said first clean, cooled gas; and burning said first gas to produce additional heat during any period of time that said second gas fails to produce sufficient steam, whereby the burning of said first gas in conjunction with the heat of said second gas continuously produces steam.

6. Apparatus according to claim 3 in which the said combination comprises a plurality of converters and of means connecting said converters with said first section of the pebble heat exchanger.

7. Apparatus according to claim 6 in which at most four converters are comprised within said combination.

8. Apparatus for cooling waste gases from a metallurgical furnace and recovering heat therefrom comprising a pebble heat exchanger having a first section for cooling said waste gases while simultaneously heating an inert material therein, and a second section for cooling said inert material, means for passing the heated inert material from said first section to said second section, means for passing a gaseous coolant material through said second section whereby heat is removed from said inert material and said gaseous material is heated, means for recycling said inert material from said second section to said first section, and heat recovery means in the form of a waste heat boiler to recover the heat imparted to said gaseous coolant material.

References Cited by the Examiner

UNITED STATES PATENTS

| | | | |
|---|---|---|---|
| 2,762,693 | 9/1956 | Hepp | 23—284 |
| 2,818,247 | 12/1957 | Francis. | |
| 2,831,467 | 4/1958 | Guczky. | |
| 2,855,292 | 10/1958 | Vogt | 75—60 |
| 2,967,693 | 1/1961 | Cunningham et al. | 165—107 |
| 3,173,489 | 3/1965 | Okaniwa et al. | 75—60 |

FOREIGN PATENTS 888,763  2/1962  Great Britain.

BENJAMIN HENKIN, *Primary Examiner.*